(12) United States Patent
Hess, III et al.

(10) Patent No.: US 12,316,782 B2
(45) Date of Patent: May 27, 2025

(54) EMBEDDED DEVICE BASED DIGITAL FINGERPRINT SIGNING AND PUBLIC LEDGER BASED DIGITAL SIGNAL REGISTERING MANAGEMENT

(71) Applicant: Cisco Technology, Inc., San Jose, CA (US)

(72) Inventors: John Herman Hess, III, Phoenix, AZ (US); Nikhil Sainath Kale, Santa Clara, CA (US); Foster Glenn Lipkey, New Market, MD (US); John Joseph Groetzinger, Baltimore, MD (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 17/898,042

(22) Filed: Aug. 29, 2022

(65) Prior Publication Data
US 2024/0073036 A1 Feb. 29, 2024

(51) Int. Cl.
*H04L 9/32* (2006.01)
(52) U.S. Cl.
CPC .......... *H04L 9/3268* (2013.01); *H04L 9/3247* (2013.01)
(58) Field of Classification Search
None
See application file for complete search history.

(56) References Cited

U.S. PATENT DOCUMENTS

| | | | |
|---|---|---|---|
| 2003/0159037 A1 | 8/2003 | Taki et al. | |
| 2018/0068091 A1 | 3/2018 | Gaidar et al. | |
| 2018/0375852 A1* | 12/2018 | Thom | H04L 63/0272 |
| 2020/0007346 A1 | 1/2020 | Callan et al. | |
| 2020/0344064 A1 | 10/2020 | Roscoe et al. | |
| 2020/0410123 A1* | 12/2020 | Chen | G06F 40/171 |
| 2021/0011674 A1* | 1/2021 | Sivapornsatain | H04L 9/0869 |
| 2022/0075846 A1* | 3/2022 | Ansari | G06F 21/10 |
| 2023/0319018 A1* | 10/2023 | Gourlay | H04L 63/0823 713/168 |
| 2023/0353372 A1* | 11/2023 | Bruso | H04L 9/3247 |
| 2023/0353384 A1* | 11/2023 | Bruso | H04L 9/3247 |

* cited by examiner

*Primary Examiner* — Anh Nguyen
(74) *Attorney, Agent, or Firm* — Lee & Hayes, P.C.

(57) ABSTRACT

Techniques are described for embedded device based fingerprint signing and public ledger registering management. A digital fingerprint associated with media content can be identified. An embedded integrated circuit (IC) of the computing device can be utilized to store security data associated with the media content. The security data can include at least one digital certificate. The at least one digital certificate can include a device certificate utilized to generate a cryptographic signature associated with the metadata and the digital fingerprint. A file can be generated and registered with a public ledger. The file can include the digital fingerprint, the metadata, the at least one certificate, and the cryptographic signature.

19 Claims, 5 Drawing Sheets

500

```
┌─────────────────────────────────────────────────────────┐
│ STORE, BY AN INTEGRATED CIRCUIT (IC) OF THE COMPUTING   │
│ DEVICE, SECURITY DATA INCLUDING AT LEAST ONE CERTIFICATE│
│                          502                            │
└─────────────────────────────────────────────────────────┘
                            │
                            ▼
┌─────────────────────────────────────────────────────────┐
│ UTILIZE THE AT LEAST ONE CERTIFICATE TO GENERATE A      │
│ CRYPTOGRAPHIC SIGNATURE ASSOCIATED WITH MEDIA CONTENT   │
│                          504                            │
└─────────────────────────────────────────────────────────┘
                            │
                            ▼
┌─────────────────────────────────────────────────────────┐
│ GENERATE A FILE INCLUDING THE AT LEAST ONE CERTIFICATE  │
│            AND THE CRYPTOGRAPHIC SIGNATURE              │
│                          506                            │
└─────────────────────────────────────────────────────────┘
                            │
                            ▼
┌─────────────────────────────────────────────────────────┐
│      TRANSMIT A REQUEST TO REGISTER THE FILE WITH A     │
│                         LEDGER                          │
│                          508                            │
└─────────────────────────────────────────────────────────┘
```

FIG. 5

EMBEDDED DEVICE BASED DIGITAL FINGERPRINT SIGNING AND PUBLIC LEDGER BASED DIGITAL SIGNAL REGISTERING MANAGEMENT

TECHNICAL FIELD

The present disclosure relates generally to, among other things, generating, via embedded integrated circuits (ICs) of user devices, cryptographic signatures of digital fingerprints associated with media content generated using the user devices; and storing the digital fingerprints and the cryptographic signatures in public ledgers.

BACKGROUND

Varieties of media content, and varieties of devices utilized to generate the media content, continue to increase in types and amounts. The media content can be generated by devices associated with individuals, as well as by devices associated with organizations of various sizes. The media content, which can include various types of content, such as image content and video content, can be utilized to generate metadata associated with the media content. The metadata can include information identifying the devices and the individuals associated with generation of the media content. The information provided by the metadata can also be used to identify a time and a location at which the media content was generated. Digital identifier information can be utilized for security and fraud prevention associated with the media content.

To accomplish this security and fraud prevention, the digital identifier information can include digital certificates used to sign digital fingerprints associated with the media content. Hash values can be generated as the digital fingerprints using hashing algorithms. The hash values can be encrypted using security keys associated with the digital certificates. However, the security and fraud prevention using this digital identifier information may have certain vulnerabilities to certain types of malicious acts. In general, authentic creators of media content are unable to prevent non-authentic parties from falsifying, disguising, or hiding information associated with the media content creators, and the devices utilized for creation of the media content.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of example communications for embedded device based fingerprint signing and public ledger registering management.

DESCRIPTION OF EXAMPLE EMBODIMENTS

Overview

Figure 1:
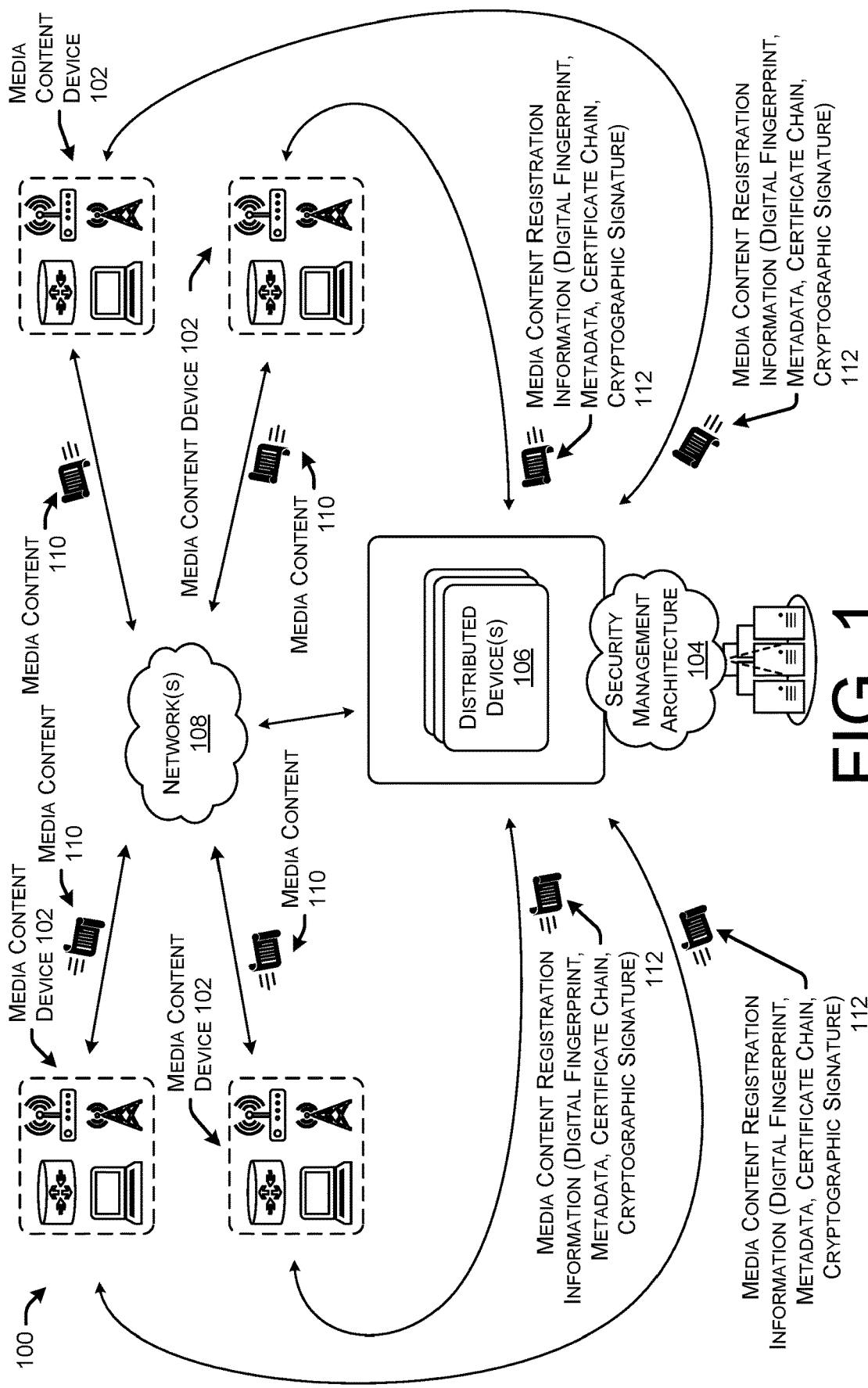
FIG. 1 illustrates an example environment for embedded device based fingerprint signing and public ledger based digital signature registering management.

This disclosure describes techniques for embedded device based fingerprint signing and public ledger registering management. An example method can include storing media content, in a computing device. The media content can be stored, based on the media content being generated by the computing device. The example method can further include identifying metadata associated with at least one of the computing device or the media content, and identifying a digital fingerprint associated with the media content. The digital fingerprint that is identified can be generated based on the media content. The example method can further include storing, by an integrated circuit (IC) of the computing device, security data associated with the media content. The security data can include at least one digital certificate. The at least one digital certificate can include a device certificate utilized to generate a cryptographic signature associated with the metadata and the digital fingerprint. The example method can further include generating and transmitting a file to request to register the file with a public ledger. The file can include the digital fingerprint, the metadata, the at least one certificate, and the cryptographic signature.

Additionally, the techniques described herein may be performed by a system and/or device having non-transitory computer-readable media storing computer-executable instructions that, when executed by one or more processors, performs the method described above.

Example Embodiments

As discussed above, protection of authenticity of electronically transmitted media content is crucial for preventing fraudulent usage of the media content. Utilizing security information generated for the media content to ensure the media content is authentic, not only protects the media content, but also enables ownership of the media content to be preserved. One way to provide security to communication of the media content is to generate digital fingerprints associated with the media content. The digital fingerprints can be signed by digital certificates to generate digital signatures associated with the media content. The digital signatures can be communicated with the media content and utilized to authenticate the media content. While the digital signatures can be generated using security keys provided by certificate authorities, digital signature technology requires all involved parties to trust that the device utilized to generate the digital signature is the original device utilized to generate the media content. Therefore, there are needs for systems and methods of protecting identification of security information associated with generation of media content.

This disclosure describes techniques and mechanisms for providing secure communications of media content. For instance, a certificate chain including digital certificates utilized to protect the media content and preserve media content ownership can include a root certificate, a manufacturer certificate, a device certificate, and a per-media certificate. The device certificate, which can be signed by the manufacturer certificate, which can in turn be signed by the root certificate, can be utilized to sign the per-media certificate. A hash value can be generated as a digital fingerprint of the media content, utilizing a mathematical algorithm. The per-media certificate can be utilized to generate a digital signature associate with the media content by signing the hash value and metadata associated with the media content. The digital signature, the digital fingerprint, the metadata, and the certificate chain can be utilized to enable secure identification of security information associated with generation of the media content.

Moreover, this disclosure describes techniques and mechanisms for utilizing an isolated and secure component of a media content device to generate security information associated with media content. For instance, an integrated circuit (IC), such as an embedded cryptographic IC (or "secure IC"), can be utilized to manage the certificate chain and the digital signature. The root certificate, the manufacturer certificate, the device certificate, and the per-media certificate can be stored by the embedded IC. A perceptual hash value of the media file can be generated, as a digital fingerprint, utilizing an algorithm (e.g., a perceptual hashing algorithm) stored by the embedded IC. The digital signature can be generated by utilizing the certificate chain stored in the embedded IC to sign the digital fingerprint and the metadata. The embedded IC can be isolated from other components of the media content device, and other devices, to prevent retrieval, and/or modification, of data (e.g., the perceptual hashing algorithm, the certificate chain, etc.) stored by the embedded IC.

Moreover, this disclosure describes techniques and mechanisms for utilizing a public ledger to store security information associated with the media content. For instance, a blockchain can be utilized to publicly record information identifying security information associated with generation of the media content. The blockchain can be utilized to store the digital fingerprints and the digital signatures associated with the media content. Various transactions associated with the media content can be stored in the blockchain, such as ownership transactions and usage right modification transactions. Identity information associated with generation of the media content being stored in the block chain can include ownership identity information. Derivative content information generated based on the media content can be stored in the blockchain, such as fingerprints of the derivative content, an entry signed by the digital signature (e.g., the digital signature associated with the original media content), and a pointer to an address of an entry of the media content (e.g., the original media content).

The techniques described herein may improve the functioning of security management architectures. For instance, rather than responding to requests from user devices by processing the requests regardless of the requests being authentic or non-authentic (e.g., invalid, malicious, fraudulent, etc.), a security management architecture can utilize security information associated with media content to determine whether to process the requests. The security information, which can be recorded in a public ledger, can include digital fingerprints and digital signatures associated with the media content. The security management architecture can approve processing of non-authentic requests based on determining request information associated with the requests matches the security information. The security management architecture can deny processing of non-authentic requests based on determining request information associated with the requests does not match the security information.

As a specific example, the security management architecture can receive a request from a user device associated with media content. The security management architecture can identify request information of the request, such as validation information indicating a result of validation of a digital fingerprint the media content. Validation of the digital fingerprint of the media content can be performed by comparing the digital fingerprint of the media content with a digital fingerprint stored in a public ledger. Performance of the validation can include determining whether a cryptographically signed certificate chain recorded in the public ledger, is authenticated by a private key of the user device. The security management architecture can approve the request as being associated with authentic media content based on the validation being successful, or deny the request as being associated with non-authentic media content based on the validation being unsuccessful. Any subsequent processing associated with the non-authentic media content, which may otherwise have been performed without using the publicly recorded digital fingerprints and digital signatures, as in techniques according to conventional technology, can be avoided based on the non-authentic request (e.g., non-authentic requests to post, register, sell, etc., fraudulent/fake media content) being denied. Various resources (e.g., compute resources, storage resources, network resources, etc.) can be conserved by avoiding processing of requests associated with the non-authentic media content. Conserving the resources can ensure availability of the resources to be allocated for other purposes.

Additionally, the techniques described herein not only improve the ability to perform security analysis on media content requests, but the techniques also reduce the amount of data that is sent between the multiple computing infrastructures to perform security analysis. For instance, meaningful data being extracted from the media content requests to perform validation of the media content requests can be utilized to eliminate network traffic otherwise occurring in existing technology due to requests associated with non-authentic media content. The requests can be avoided and/or prevented by denying an initial request (e.g., malicious and/or fraudulent request) from a media content device that generated the non-authentic media content. Network resources that may otherwise have been exhausted according to techniques in existing technology, can be utilized for other purposes according to security protection techniques as discussed in the current disclosure.

Although operations for validating requests and/or media content associated with the requests, operations for public ledger registration associated with the media content, and/or various other operations associated with usage of the media content, are described as being performed by a security management architecture, the techniques may equally be performed by any component, or combination of components, of the security management architecture or any other architecture or devices. The security management architecture, other devices of the security management architecture, and/or other devices of the other architecture or system may provide, individually, or in combination, any of the features discussed herein related to security analysis of the requests and/or the media content.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 for embedded device based fingerprint signing and public ledger based digital signature registering management. The environment 100 may include one or more media content devices 102 and a security management architecture 104. The security management architecture 104 may include one or more distributed devices 106, which may be housed in one or more data centers. The media content device(s) 102 and the distributed device(s) 106 may exchange communications with one another via one or more networks 108. The media content device(s) can include various types of devices, including, but not limited to, computers, mobile devices, internet of things (IOT) devices, cameras, microphones, and/or any other media content devices.

The network(s) 108 may be implemented by any viable communication technology, such as wired and/or wireless modalities and/or technologies. The network(s) 108 may be implemented utilizing one or more network devices associated with the security management architecture 104 and, possibly, one or more third-party devices. For instance, the network device(s) may include routers, switches, computers, or any other type of network device. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one network segment to another by nodes in the computer network. The network(s) 108 may include multiple devices that utilize the network layer (and/or session layer, transport layer, etc.) in the OSI model for packet forwarding, and/or other layers.

The one or more data centers may be physical facilities or buildings located across geographic areas designated to store networked devices, which may include devices in the security management architecture 104. The data centers may include various network devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the packet-forwarding networks may not be located in explicitly defined data centers, but may be located in other locations or buildings.

As discussed in greater detail below with reference to FIG. 2, the media content device(s) 102 can electronically manage (e.g., identify, generate, store, process, modify, delete, communicate, etc.) media content 110. The media content device(s) 102 can include an integrated circuit (IC), such as an embedded cryptographic IC (or "secure IC") (or "embedded IC"), to store information associated with the media content 110. The information stored in the embedded IC can include one or more types of media content registration information 112, and one or more types of security information (e.g., one or more private security keys) utilized to generate the media content registration information 112. Any information stored in the embedded IC can be stored as a local file.

Media content (e.g., the media content 110) can include various types of media content. In some examples, the media content can include image content (or "image(s)") (e.g., data utilized for output of the images), video content (e.g., a movie, a show, or any type of video content, etc.) (e.g., data utilized for output of the video content), audio content (e.g., data utilized for output of the audio content), and/or any other type of content (e.g., data) generated by a media content device.

The media content registration information 112 can include various types of security information. By way of example, the media content registration information 112 can include one or more of a digital fingerprint, metadata, a certificate chain, and a digital signature (e.g., a cryptographic signature). The digital fingerprint can be generated utilizing transformed information (e.g., transformed media content and/or transformed media content registration information). The digital fingerprint (e.g., a perceptual hash generated as a fingerprint) of the transformed information can be generated utilizing one or more perceptual hashing algorithms (e.g., a discrete cosine transform algorithm, etc.).

By utilizing the perceptual hashing algorithm(s), content (e.g., the media content 110 and/or the media content registration information 112) can be identified after transformations are performed (e.g., by identifying the content that was utilized to generate the transformed content). The transformations, which can be performed to generate the transformed information, can include transformations of one or more portions of the media content 110 and/or one or more portions of the media content registration information 112. The transformed information can include one or more portions of data (e.g., bit string) of a smaller size (e.g., 0.01%, 0.1%, 1%, 10%, etc., of a total size of the media content 11) than the media content 110 and/or the media content registration information 112. The transformations can include one or more of resizing (e.g., increasing or decreasing a size of data utilized for output of the media content 110 and/or the media content registration information 112), transcoding (e.g., converting an encoding algorithm of the media content 110 and/or the media content registration information 112 from one type (e.g., H.264 for video, PNG for still images, etc.) to another type (e.g., HEVC for video, WEBP for still images, etc.) any portion(s) of various types of content. The digital fingerprint (e.g., a perceptual hash generated as a fingerprint) can uniquely identify the media content 110 (e.g., distinguish the media content 110 from any other media content) and/or the media content registration information 112.

The metadata can include information identifying the media content device 102 utilized to generate the media content 110. The information included in the metadata can further include user information, such as an identifier of the individual (e.g., the owner of the media content device 102) associated with generation of the media content, and/or any other information associated with the media content device 102 and/or the owner.

The certificate chain can include digital certificates utilized to protect the media content and preserve media content ownership. The digital certificates can include a root certificate, a manufacturer certificate, a device certificate, and a per-media certificate. The device certificate, which can be signed by the manufacturer certificate, which can in turn be signed by the root certificate, can be utilized to sign the per-media certificate.

The digital signature can be generated by utilizing the per-media certificate. The per-media certificate can be utilized to sign a hash value (or "hash") (e.g., the digital fingerprint generated utilizing a mathematical algorithm) of the media content 110, and, possibly, metadata associated with the media content 110. The digital signature can be generated utilizing the signed information (e.g., the hash value of the media content 110 and the metadata).

Any of one or more certificates of the certificate chain can be protected via public key infrastructure (PKI) technology (e.g., the root certificate can be signed via PKI by a certificate authority (CA). In some examples, an organization operating the distributed device(s) 106 can be a CA. In those or other examples, one or more CAs utilized to generate any of the certificates can be implemented by one or more third-party devices.

In some examples, any of one or more of the certificates of the certificate chain can include, and/or be associated with, a public key (e.g., the public key can be managed, utilized, and/or stored, along with the corresponding certificate). Although the certificate(s) can be utilized for digital signatures, as discussed throughout this disclosure, it is not limited as such. The creating of digital signatures and/or performance of signing according to any techniques discussed herein can be performed utilizing the public key associated with the corresponding certificate.

Although the digital signature can be generated, as discussed above in the current disclosure, it is not limited as such. Signing of the media content 110, for example, with instances in which the media content 110 includes video content, can be performed by generating one or more digital signatures on a per-keyframe basis (e.g., separate signatures can be generate for each keyframe of the video). Signing of the media content 110, for example, with instances in which the media content 110 includes image content, can be performed by generating one or more digital signatures on a per-still image basis (e.g., separate signatures can be generate for each image).

Media content, and/or information associated with the media content, can be electronically communicated, via one or more communications associated with the media content. The communication(s) (e.g., message(s)) associated with the media content) (or "media content communications"), which can include various types of communications of various formats, can be exchanged between the media content device(s) 102, the distributed device(s) 106, and/or one or more other devices.

Various types of information can be included in media content communication(s) and utilized in different ways according to the communication type(s). The communication(s) can include information of various types, which can include one or more of source device information (e.g., one or more of a device identifier (ID), a media access control (MAC) address, an IP address, a telephone number, an equipment serial number (ESN), an integrated circuit card identification number (ICCID), operating system (OS) identification and/or version information, an international mobile equipment identity (IMEI)/international mobile subscriber identity (IMSI) number, etc.), user information (e.g., one or more of a name, an address, a phone number, a date of birth, an email address, a password, an account number, etc.), destination device information (e.g., some or all of the types of information possibly included as the source device information), media content information (e.g., the media content, geolocations and/or timestamps associated with the media content device 102 at generation of the media content 110, the media content registration information 112, discussed below, etc.), and any other type of information utilized for security protection of the media content 110.

The communication(s) can be utilized for various purposes. One or more of the communication(s), individually or in combination, can be utilized for one or more of registration, validation, acquisition, identification, modification (or "supplementation"), authentication, ownership transfer, usage rights transfer, restrictions update, etc., of media content.

The media content communication(s) can include one or more communications (e.g., media content registration communication(s)) (or "registration request(s)") requesting registration of media content. The registration of the media content can be utilized to register various types of information (e.g., information associated with the media content), including the media content 110, the media content registration information 112, media content device configuration information (e.g., optical camera settings), usage rights information (e.g., a licensing type, one or more attribution requirement(s), publication information (e.g., information limiting and/or restricting unauthorized publication)), device information (e.g., sensor readings from the media content device (e.g., temperature, etc.)), etc.

In some examples, the registration request(s) can be utilized to request public ledger registration of the media content 110. In those examples, the public ledger registration can include registration of the media content 110 by a blockchain. The media content 110 (e.g., public ledger registered information) (e.g., a file including the public ledger registered information) registered with a public ledger (also referred to herein as "ledger") can be published via the public ledger. In some examples, the public ledger can include one or more distributed public ledgers, and/or a centralized public ledger.

The public ledger registered information can include the digital fingerprint(s), the geolocation, the timestamp, the certificate chain, and the digital signature. The digital fingerprint(s), the geolocation, the timestamp, the certificate chain, and the digital signature can be managed as different attributes associated with the media content 110. The public ledger registered information (e.g., public ledger published information) being published via the public ledger can be accessed by any other device (e.g., the media content device(s) 102, the distributed device(s), and/or one or more other device).

The registration request(s) can include information (e.g., registration request information) utilized, as the media content registration information 112, to register the media content 110. Alternatively or additionally, the registration request(s) can include one or more of other types of information (e.g., other types of registration request information), including one or more of a time and/or date of creation, time and/or date of transmission of the registration request(s), etc. Alternatively or additionally, the registration request information can include one or more of a public ledger identifier (e.g., a blockchain identifier), an address (e.g., a website address), an application identifier (e.g., a mobile application identifier) associated with media content registration, and/or any other type of public ledger registry information.

The registration request(s) can be utilized to identify various devices associated with the registration request(s). By way of example, a registration request can be received by the distributed device(s) 106. The registration request can be received in various ways. In some examples, the registration request can be directly received from a user device and by the distributed device(s) 106. In other examples, the registration request can be received from the user device and by the distributed device(s) 106 via the media content device. The registration request can be utilized to identify a media content device from which the registration request is received as being associated, as a media content device 102, with creation of the media content identified in the registration request. The registration request can be utilized to identify media content identified in the registration request as being created, as media content 110, by the media content device 102. The registration request can be utilized to identify media content registration information included in the registration request as the media content registration information 112.

The distributed device(s) 106 can utilize the registration request information to determine whether to perform media content registration. In some examples, the distributed device(s) 106 can perform the identifying of the media content device 102 and the media content 110. The distributed device(s) 106 can register the media content registration information 112 based on the identifying that the media content device 102 and the media content 110 as being associated with the registration request.

The identifying that the registration request is associated with the media content device 102 and the media content 110 can be performed based on the media content registration information 112. In some examples, the distributed device(s) 106 can identify various types of information in the media content registration information 112, including a digital fingerprint, metadata, a certificate chain (e.g., one or more of root certificate, a manufacturer certificate, a device certificate, and a per-media certificate), and/or a digital signature associated with the media content 102. The distributed device(s) 106 can register the media content registration information 112 with the public ledger as the public ledger registered information, based on the registration request information.

In some examples, the public ledger registered information can include any of the user information (e.g., the user information, as discussed above; and/or usage rights associated with the media content and/or the media content owner). In other examples, one or more portions of the user information can be omitted from the public ledger registered information. Whether the public ledger includes the any of user information in the public ledger registered information can be based on information received from the media content device 110. In some examples, information associated with selections indicated via user input received by the media content device 110 can be utilized to include, or omit, one or more portions of the user information in the public ledger. The usage rights (e.g., usage rights associated with the media content and/or usage rights of the media content owner) can include a licensing schema (e.g., a general public license (GPL)), public domain rights, and/or any other types of usage rights.

In some examples, one or more restrictions associated with the media content 110 can be utilized to control how the media content 110 can be used. The registration request can indicate restriction information identifying the restriction(s) and/or the omission thereof. The restriction information can indicate the media content 110 is allowed to be used (e.g., published) by one or more public content distribution services, such as social media sites. In those or other examples, the restriction information can indicate the media content 110 is allowed to be used (e.g., published) by any and all public content distribution services, such as social media sites. In other examples, the restriction information can indicate the media content 110 is restricted from use (e.g., publication, sale, modification, etc.) by one or more public content distribution services, such as social media sites. In those or other examples, the restriction information can indicate the media content 110 is restricted from use (e.g., publication, sale, modification, etc.) by any and all public content distribution services, such as social media sites. The restriction information can indicate one or more costs, and/or attribution instructions (e.g., instructions indicated attribution information is to be posted with certain types of media content usage) associated with any type of usage by owners, based on identification of owners, identification of types of owners, etc.

The media content device 102 can be utilized by the owner of the media content 110 to enforce the restriction(s) identified via the restriction information. In some examples, the owner of the media content 110 can transmit, via the media content device 102, one or more requests to any devices (e.g., a social media site publishing the media content 110, notwithstanding the restriction information associated with, and published for, the media content 110 restricting publication by that social media site, or by all, social media sites) associated with violations of the restriction(s), and/or any devices (e.g., the distributed device(s) 106 and/or other devices) utilized to enforce the restriction(s). The owner of the media content 110 can transfer similar communications devices to request payment, enforce attribution, or request take-down of registered media content, based on the restriction(s). The requests being transferred to request compliance with restrictions can be processed by devices receiving the requests, based on ownership of the media content 110 being securely provided and/or proved/verified by the media content device 102 (e.g., the public ledger registered information) and/or one or more other devices, and/or ownership information being accessed/identified via the public ledger.

In some examples, the distributed device(s) 106 can transmit a result of registration performed based on the registration request to any of one or more devices. In some examples, the distributed device(s) 106 can transmit a result of registration performed based on the registration request to the media content device 102 from which the registration request was received, and/or to one or more user devices.

The media content communication(s) can include one or more communications (e.g., media content validation communication(s)) (or "validation request(s)") requesting validation of media content. In some examples, validation, which can be performed by a device (or "validation device" or "validator") and, for example, via the validation request(s), can be utilized by the validator to validate usage rights and/or authenticity of the media content 110. The validation device can receive the media content 110 from another device (or "upload device" or "uploader") of another user. The validation device and/or the upload device can be any device (e.g., the media content device(s) 102, user device(s), other device(s), etc.). The validation device can compute a perceptual hash (e.g., the digital fingerprint) of the media content using the same algorithm as the original media device utilized to generate the media content). In those or other examples, the upload device may have previously provided one or more certificates (e.g., certificate(s) in the certificate chain, such as the per-media certificate) and complete a cryptographic challenge using associated private key(s) to prove ownership of the private key(s) and hence the media content 110.

To request verification of the completion of the cryptographic challenge, the validation device can exchange communications (or "consult communications") with one or more distributed devices 106 (e.g., device(s) storing the ledger) to identify one or more entries matching the computed perceptual hash. The validation device can check the cryptographic signing of the certificate chain to confirm integrity based on a result the cryptographic challenge performed by the upload device. If the upload device provided the certificate(s) (e.g., the per-media certificate) and successfully completed the cryptographic challenge, the distributed device(s) 106 can compare received certificate(s) to corresponding certificate(s) (e.g., one or more certificates in the certificate chain, such as the per-media certificate) found in the ledger. Otherwise, if the upload device did not provide the certificate(s) and/or successfully completed the cryptographic challenge, the distributed device(s) 106 can transmit a request for the certificate(s) and/or completion of the cryptographic challenge, and receive, based on the request, the certificate(s) and the completion of the cryptographic challenge. If there is a match between the certificate(s) provided by the upload device and the certificate(s) in the ledger, the validation device can identify (or "recognize") the upload device, and/or a user of the upload device, as the owner device and/or the owner, respectively, of the uploaded content (e.g., the media content 110). The validation device can perform various processes, such as applying usage rights as per one or more specifications included in a registration file retrieved from the ledger, based on the verifying of the owner device and/or the owner.

The validation request(s) can be utilized to validate various types of media content, such as media content a user device identifies at, accesses at, and/or receives from, a media content device 102, the distributed device(s) 106, and/or any other device. By way of example, a validation request can be received by the distributed device(s) 106. The validation request can be received in various ways. In some examples, the validation request can be directly received from the user device and by the distributed device(s) 106. In other examples, the validation request can be received from the user device and by the distributed device(s) 106 via the media content device 102. The validation request can be utilized to determine whether information (e.g., validation request information) in the validation request is associated with media content (e.g., the media content 110) created by a media content device 102.

The validation request information can include various types of information utilized to identify the media content. In some examples, the validation request information can include a media content identifier, such as an address, and/or any location, identification, and/or access information associated with the media content identified by the validation request information. In those or other examples, the validation request information can include the media content to be validated based on the validation request information. In those or other examples, the validation request information can include any type of security information (e.g., similar information as in the media content registration information 112). By way of example, the validation request information can include one or more of digital fingerprint, metadata, a certificate chain, and a digital signature associated with the media content to be validated based on the validation request information.

The distributed device(s) 106 can utilize the validation request information to identify location and/or access information of public ledger registered information (e.g., media content registration information registered by, and accessible via, the public ledger). The location and/or access information can include device information (e.g., any of one or more similar types of information in the source device information, as discussed above), digital address information (e.g., web site information, etc.), account information (e.g., an account identifier, a username, a password, etc.), etc., and any other type of information utilized to locate and/or access the public ledger registered information.

The distributed device(s) 106 can utilize the public ledger registered information to determine whether the media content validation information is associated with valid media content. The media content validation information can be determined as being associated with valid media content based on determining the media content validation information matches the public ledger registered information. In some examples, any of the media content validation information (e.g., one or more of the digital fingerprint, the metadata, the certificate chain, and the digital signature in the validation request) can be compared with any of the public ledger registered information (e.g., one or more of the digital fingerprint, the metadata, the certificate chain, and the digital signature in the public ledger). The media content validation information can be determined to match the public ledger registered information based on a successful result of a comparison (e.g., a comparison between the media content validation information and the public ledger registered information). The comparison result may be successful only in such cases as for the media content validation information being generated by the same media content device 102 that generated the public ledger registered information. The user device can request and receive the media content validation information from the media content device 102 for the validation request.

In some examples, the distributed device(s) 106 can utilize the validation request information to identify location and/or identity information of security information (e.g., a private security key utilized for generation of the public ledger registered information, the private security key being stored in an embedded IC of the media content device 102), and/or the location and/or identity information of the media content device 102 storing the private security key (or "private key"). In those or other examples, the location and/or identity information of the private security key and/or the media content device 102 (e.g., the media content device 102 storing the private security key) can be utilized to identify security information (e.g., one or more of the digital fingerprint, the metadata, the certificate chain, and the digital signature in the validation request), to perform media content validation, based on the validation request information not including one or more types of security information (e.g., one or more of the digital fingerprint, the metadata, the certificate chain, and the digital signature in the validation request). The private security key, which may protected from access by any other devices aside from the media content device 102 (e.g., the media content device 102 utilized for creation of the media content identified in the validation request information), can be utilized for validation of the media content identified in the validation request information. The validation request information (e.g., the media content identifier) can be utilized to obtain the location and/or identity of the private security key and/or the media content device 102 storing the private security key.

The distributed device(s) 106 can determine, based on the location and/or access information of the public ledger registered information, the location and/or identity information of the private security key, and/or the location and/or identity information of the media content device 102 (e.g., the media content device 102 storing the private security key), whether media content associated with the validation request information is valid media content (e.g., media content utilized to generate the public ledger information). The distributed device(s) 106 can identify and/or access portions of the public ledger registered information, including the digital fingerprint, the metadata, the certificate chain, and/or the cryptographic signature.

The distributed device(s) 106 can perform validation by transmitting a request to, and receiving a response (or "reply") from, the media content device 102 (e.g., the media content device 102 storing the private security key), based on the validation request(s), and/or any relevant information (e.g., the location and/or access information). The request transmitted to, and the response received from, the media content device 102 can be utilized to retrieve any of the media content validation information (e.g., one or more of the digital fingerprint, the metadata, the certificate chain, and the digital signature in the validation request), based on one or more portions of the media content validation information having been not previously received. The retrieved media content validation information can be utilized to determine the media content validation information matches the public ledger registered information as the media content registration information 112, in a similar way as discussed above for cases in which the validation request includes the one or more of the digital fingerprint, the metadata, the certificate chain, and the digital signature in the validation request.

Although the user device can transmit the validation request(s), as discussed above in the current disclosure, it is not limited as such. One or more devices of any type can utilize validation request(s) to validate media content according to any of the techniques discussed herein, in a similar way as for the validation request(s) transmitted by the user device. By way of example, devices utilized for operation of a website and/or for any other operations can receive media content (or "received media content") from a device, and utilize the validation request(s) to determine whether the received media content is valid media content (e.g., the media content 110 as originally created, without alterations) and whether the device from which the media content was received is a valid media content device (e.g., the media content device 102 utilized for creation of the media content 110). In some examples, the validation request can be utilized for validation of modified media content, as discussed below.

By way of another example, a device that identifies media content (e.g., for-sale media content) for sale can utilize the validation request(s) to determine whether the for-sale media content is valid media content (e.g., the media content 110 as originally created, without alterations) and whether the device from which the for-sale media content was received is a valid media content device (e.g., the media content device 102 utilized for creation of the media content 110). Media content (e.g., purchased media content) associated with a purchase transaction can be validated in a similar way as for the for-sale media content.

By way of another example, a device that identifies media content (e.g., any other type of media content not for sale, and/or not having been purchased) for one or more purposes of any other type (e.g., private and/or public distribution) can utilize the validation request(s) to determine whether the media content is valid media content in a similar way as for the for-sale media content and/or the purchased media content.

Although one or more of the digital fingerprint, the metadata, the certificate chain, and the digital signature associated with the validation request can be utilized for comparison with the public ledger registered information, as discussed above in the current disclosure, it is not limited as such. In some examples, a portion (e.g., a predetermined portion) of the security information can be utilized for processing the validation request. In those examples, the predetermined portion of the security information can include all of the digital fingerprint, the metadata, the certificate chain, and the digital signature. In other examples, the predetermined portion of the security information can include less than all of the digital fingerprint, the metadata, the certificate chain, and the digital signature (e.g., the predetermined portion of the security information can include the digital fingerprint and the digital signature, and/or a combination of any other of one or more security information portions).

Although the validation request can be utilized to obtain one or more of the digital fingerprint, the metadata, the certificate chain, and the digital signature for comparison with the public ledger registered information, as discussed above in the current disclosure, it is not limited as such. In some examples, a validation request transmitted to any of one or more devices (e.g., the distributed device(s) 106 and/or one or more other devices) can be further utilized to validate information stored in a digital wallet associated with the media content device(s) 102. An owner of the media content 110 can input a request to securely transfer, to the digital wallet, of one or more certificates (e.g., the per-media certificate) and/or one or more security keys (e.g., private key(s)).

Although the embedded IC may be utilized to securely store the certificate(s) (e.g., the per-media certificate) and/or the private key(s) as discussed above in the current disclosure, it is not limited as such. The media content device(s) 102 may, to implement any techniques discussed throughout this disclosure, utilize the digital wallet and the embedded IC for cryptographic functions (e.g., storing the certificate(s) (e.g., the per-media certificate) and/or the private key(s), validating the certificate(s) and/or the private key(s), performing cryptographic challenges, etc.), such as for cases in which the media content device 102 is a general computing device (e.g., a smart phone), if the user uploads the content (e.g., the certificate(s) (e.g., the per-media certificate) and/or the private key(s)) from the same device. In those or other examples, if the user uploads the content (e.g., the certificate(s) (e.g., the per-media certificate) and/or the private key(s)) from the same device, information in the digital wallet may be utilized along with information in the embedded IC for the cryptographic functions (e.g., the digital wallet can use the embedded IC for the cryptographic functions). In some examples, a digital wallet can be stored by the media content device 102 and/or another device.

Although the distributed device(s) 106 may perform validation based on the validation request(s) as discussed above in the current disclosure, it is not limited as such. In some examples, the validation device can transmit one or more validation requests to one or more public key infrastructure (PKI) devices. The PKI devices can validate whether any of the certificate(s) are, and/or the certificate chain is, signed by a trusted root certificate. In some examples, the PKI device(s) can be implemented as the distributed device(s) 106 and/or one or more other devices.

The distributed device(s) 106 can transmit a result of validation performed based on the validation request to any of one or more devices. In some examples, the device(s) (e.g., the distributed device(s) 106, the PKI device(s), etc.) can transmit a result of validation performed based on the validation request to the media content device 102 and/or the user device from which the validation request was received.

Although the validation request can be received from the user device, as discussed above in the current disclosure, it is not limited as such. In some examples, the validation request can be received from any device and utilized to perform validation of media content in any other device, in a similar way as discussed above for the validation based on the validation request being received from the user device. In some examples, the validation request(s) can be utilized for processing validation(s) for any media content subsequent, or prior to, any types of communications, as discussed herein.

In some examples, the type(s) of communications can include one or more communications (e.g., media content acquisition communication(s)) (or "acquisition request(s)") (or "transmission request(s)") for acquisition of media content. The acquisition request(s), which can be received from a user device, can include information (e.g., acquisition request information) identifying a destination device (e.g., the user device) for transmission of the media content. The acquisition request information can be utilized by the distributed device(s) 106 to determine whether to route the communication(s) to the destination device. In some examples, the acquisition request(s), and/or one or more other supplemental communications associated with the acquisition request(s), can be performed in a similar way as for the validation request(s).

By way of example, an acquisition request can be utilized to determine whether media content indicated by the acquisition request information is valid. The acquisition request information can include similar information as in the validation request information. The media content indicated by the acquisition request information can be validated in a similar way as for validation of the media content in the validation request information. Transmission of the media content indicated in acquisition request information can be performed based on a successful result of the validation of the media content indicated in the acquisition request information. In some examples, the acquisition request can be utilized for validation of modified media content, and/or any media content subsequent, or prior to, any types of communications, as discussed herein. In some examples, the acquisition request(s) can be utilized for processing acquisition(s) for any media content subsequent, or prior to, any types of communications, as discussed herein.

In some examples, the type(s) of communications can include one or more communications (e.g., media content identification communication(s)) (or "identification request(s)") for identification of media content. The identification request(s), which can be received from a user device, can include information (e.g., identification request information) identifying media content. By way of example, an identification request can include preliminary information (e.g., one or more types of the security information) identifying the media content 110. The preliminary information can be utilized to identify any other types of identification information (e.g., one or more different types of the security information) based on a request for identification of the media content 110. In some examples, the identification request(s) can be processed based on a successful result of the validation of the media content indicated in the identification request information, the validation being performed in a similar way as for the validation request. In some examples, the identification request(s) can be utilized for processing identification(s) for any media content subsequent, or prior to, any types of communications, as discussed herein.

In some examples, the type(s) of communications can include one or more communications (e.g., media content modification communication(s)) (or "modification request(s)") for modification of media content. The modification request(s), which can be received from a user device, can include information (e.g., modification request information) identifying media content (e.g. modified media content) having been modified. By way of example, the modification request information can include information (e.g., location information) associated with the modified media content (e.g., media content having been generated by a media content device and modified by the media content device or another device). In some examples, the modification request information can include the modified media content and/or the media content (e.g., the original media content that was modified).

In some examples, the modification request can be utilized to register the modified media content in a similar way as for the registration request, based on the successful result of the validation of the media content utilized to generate the modified media content. The validation of the media content utilized to generate the modified media content indicated in the modification request information can be performed, in a similar way as for the validation request.

The registration of the modified media content can include registration (e.g., public ledger registration) of security data (e.g., one or more of a root certificate, a manufacturer certificate, a device certificate, and a per-media certificate) associated with the modified media content, based on the security data of the media content utilized to generate the modified media content. The registration can be performed based on authorization information received from the media content device 102 utilized to generate the media content (e.g., the media content utilized to generate the modified media content). The authorization information can include information based on selections received by the media content device 102 via user input. In some examples, authorization information may be received based on an authorization request sent to the media content device 102, and an authorization response received from the media content device 102. In other examples, an authorization communication can be received from the user device in a similar way as for the authorization response, without transmission of an authorization request.

The authorization information can include information indicating input received from a user of the media content device 102 and/or security information (e.g., supplemental security information) associated with authorization of the modified media content. The authorization information can include information (e.g., the supplemental security information) associated with selections received by the media content device 102 via user input. The authorization information can be signed with the certificate chain created based on the media content 110 to generate a digital fingerprint (e.g., a supplemental digital fingerprint) and a cryptographic signature (e.g., a supplemental digital signature) associated with the authorization information and the modified media content. The authorization information can be registered with the public ledger.

The authorization information can be utilized to perform registration of the modified media content. The authorization information can include, as updated authorization information, security information (e.g., modification security information) associated with the user device, from which the modification request was received. In some examples, the modification security information can be received from the user device, from which the modification request was received, based on a request (e.g., a modification security information request) transmitted to the user device, and a response (e.g., a modification security information response) received from the user device. In other examples, modification security information can be received from the user device, by receiving a communication (e.g., a modification security information communication) from the user device, without transmission of a modification security information request.

The updated authorization information can include the authorization information, and user device information (e.g., information indicating input received from a user of the user device utilized to generate the modified media content). The updated authorization information can be identified, and/or generated, based on selections received by the user device via user input, the selections being utilized to input the authorization and/or to generate the modification security information. The updated authorization information can include location and/or access information (e.g., a pointer) associated with the public ledger registered information for the media content 110 (e.g., the media content 110 utilized to generate the modified media content). The pointer can include data utilized to access, view, or obtain the public ledger registered information for the media content 110.

The updated authorization information can be signed using the modification security information. By way of example, the updated authorization information can be signed with a certificate chain (e.g., a modification certificate chain) (e.g., one or more of root certificate, a manufacturer certificate, a device certificate, and a per-media certificate) associated with the modified media content. The modification certificate chain can be associated with, and/or generated utilizing, the user device (e.g., from which the modified request was received) and/or information (e.g., a private key) stored in the user device (e.g., stored in an embedded IC of the user device).

The modification certificate chain can be utilized to generate modification security information. The modification security information can include a digital fingerprint (e.g., a modification fingerprint) and a cryptographic signature (e.g., a modification cryptographic signature) associated with the updated authorization information. In some examples, the modification digital fingerprint and the modification digital signature can be generated utilizing the updated authorization information, without utilizing the modified media content and/or metadata (e.g., modification metadata) associated with the modified media content. In other examples, the modification digital fingerprint and the modification digital signature can be generated utilizing all of the updated authorization information, the modified media content, and the metadata associated with the modified media content (e.g., all of the updated authorization information, the modified media content, and the metadata associated with the modified media content can be signed). One or more of the updated authorization information (e.g., the updated authorization information having been digitally signed), the modification digital fingerprint, the modification metadata, the modification certificate chain, and the modification cryptographic signature, can be registered with the public ledger.

Although the public ledger (e.g., the public ledger utilized to register the media content 110, which is utilized to generate the modified media content) can be utilized for registration of the updated authorization information (e.g., the updated authorization information having been digitally signed), the modification digital fingerprint, the modification metadata, the modification certificate chain, and the modification cryptographic signature, can be registered with the public ledger, as discussed above in the current disclosure, it is not limited as such. In some examples, a different public ledger (e.g., a public ledger of the same type, such as a different blockchain, or a public ledger of a different type) can be utilized for the registration in a similar way as for the public ledger utilized to register the media content 110.

Although the modification request can be received from the user device, as discussed above in the current disclosure, it is not limited as such. In some examples, the modification request can be received from any device and utilized to perform modification of media content in any other device, in a similar way as discussed above for the modification based on the modification request being received from the user device.

In some examples, the modification request, which can be received from a media content device 102, can include modification request information identifying modified media content based on media content (e.g., media content 110) generated utilizing the media content device 102. The modification request identifying modified media content based on the media content 110 generated utilizing the media content device 102 can be processed in a similar way as discussed above for the modification request received from the user device, except without modification security information. Because the supplemental security information indicating authorization of the modification identified in the modification request information can be determined as being associated with the media content device 102 that generated the media content 110 (e.g., the media content 110 utilized to generate the modified media content), the supplemental security information can be utilized to register the supplemental security information with the public ledger. The supplemental security information can be utilized by any device accessing the public ledger, and/or any device communicating with the distributed device(s) 106, to determine the modified media content is valid. The supplemental security information, which can be generated utilizing the same private security key stored in the embedded IC of the media content device 102, can be utilized to indicate the same media content device 102 generated the media content 110 and the modified media content. In some examples, the modification request(s) can be utilized for processing modification(s) for any media content subsequent, or prior to, any types of communications, as discussed herein.

In some examples, the type(s) of communications can include one or more communications (e.g., media content authentication communication(s)) (or "authentication request(s)") for authentication of media content. The authentication request(s), which can be received by the distributed device(s) 106 and from a media content device (e.g., a media content device 102), can include information (e.g., authentication request information) identifying media content associated with a user device. By way of example, authentication request information can be received in an authentication request. The authentication request information can include similar information as in the validation request information, except with the authentication request information identifying media content not generated utilizing the media content device 102, and/or security information associated with media content 110 generated by the media content device 102.

In some examples, the media content device 102 can identify the media content identified via the authentication request information, based on analysis (e.g., automatic analysis by software operated by the media content device 102 or one or more other devices; manual analysis performed by an owner of the media content device 102, etc.). The media content may be identified based on one or more similarities between the media content (e.g., the media content not generated by the media content device 102) and the media content 110 generated by the media content device 102.

For example, for any validation and/or authentication, and with instances in which the media content 110 is video content, the similarity(ies) between the media content not generated by the media content device 102 and the media content 110 generated by the media content device 102 can be identified based on one or more matching or similar data segments, one or more matching or similar video frames, one or more matching or similar pixels between corresponding frames, one or more matching or similar audio segments, one or more matching or similar patterns (e.g., visual patterns, audio patterns, etc.) between a combination thereof, etc. For example, with instances in which the media content 110 is image content, the similarity(ies) between the media content not generated by the media content device 102 and the media content 110 generated by the media content device 102 can be identified based on one or more matching or similar data segments, one or more matching or similar pixels, one or more matching or similar patterns based on a combination thereof, etc. For example, with instances in which the media content 110 is audio content, the similarity(ies) between the media content not generated by the media content device 102 and the media content 110 generated by the media content device 102 can be identified based on one or more or similar matching data segments, one or more matching or similar patterns based on a combination thereof, etc.

The authentication request information can be utilized to determine whether the media content identified in the authentication request information is valid. Various types of information can be utilized for a comparison based on the authentication request information. In some examples, the security information included in, or identified by, the authentication request information can include public ledger registered information, and/or identification and/or access information (e.g., a digital location/address) associated with the public ledger registered information. In other examples, public ledger registered information can be associated with the media content 110. In other examples, for instances in which the media content 110 is identified by the authentication request information, without any of the security information (e.g., the security information and/or location information associated with the security information) being included in the authentication request information, the public ledger registered information can be identified utilizing the media content 110. In those examples, distributed device(s) 106 can utilize information (e.g., log information stored in a database), identified and/or obtained from the distributed device(s) 106, the media content device 106 and/or any other device, to identify the public ledger registered information and/or a location of a public ledger associated with the public ledger registered information.

The distributed device(s) 106 can validate whether the media content identified by the authentication request information is valid, based on the public ledger registered information. In some examples, the distributed device(s) 106 can identify the media content 110, with which the public ledger registered information is associated, and determine whether the identified media content 110 matches the media content identified by the authentication request information. In other examples, the distributed device(s) 106 can determine and/or generate security information (e.g., authentication security information) based on the media content identified by the authentication request information, in a similar way as for the security information generated based on the media content 110. In those or other examples, the distributed device(s) 106 can determine whether the authentication security information matches the public ledger registered information.

The distributed device(s) 106 can transmit a result of authentication performed based on the authentication request to any of one or more devices. In some examples, the distributed device(s) 106 can transmit a result of authentication performed based on the authentication request to the media content device 102 from which the registration request was received, and/or to one or more user devices.

Although the authentication request can be received from the media content device 102, as discussed above in the current disclosure, it is not limited as such. In some examples, the authentication request can be received from any device and utilized to authenticate media content in any other device, in a similar way as discussed above for the authentication based on the authentication request being received from the media content device 102. In some examples, the acquisition request can be utilized for validation of modified media content, as discussed above. In some examples, the authentication request(s) can be utilized for processing authentication(s) for any media content subsequent, or prior to, any types of communications, as discussed herein.

In some examples, the type(s) of communications can include one or more communications (e.g., media content ownership transfer communication(s)) (or "ownership transfer request(s)") for transferring ownership of media content. The ownership transfer request(s) and/or the usage rights transfer request(s) can be performed in a similar way as for the modification request(s), as discussed above. However, for examples with which the ownership is being transferred, the modification request information can include information (e.g., new owner information) associated with a new owner of the media content, alternatively or in addition to, the modified media content. The new owner can be established and/or registered based on the modification request information being utilized to release ownership of the current owner (e.g., the initial/original owner, or a subsequent owner). The new owner information can include information associated with the new owner, which can be similar to the account information and/or the user information, as discussed above.

The new owner information can be utilized to register modification security information by the public ledger. The new owner information can be included in the public ledger registered information. In some examples, the public ledger registered information can include any of the new user information. In other examples, one or more portions of the new user information can be omitted from the public ledger registered information. Whether the public ledger includes the any of new user information in the public ledger registered information can be based on information received from the media content device 110. In some examples, information associated with selections indicated via user input received by a device of the new owner can be utilized to include, or omit, one or more portions of the new user information in the public ledger. In some examples, the ownership transfer request(s) can be utilized for processing ownership transfer(s) for any media content subsequent, or prior to, any types of communications, as discussed herein.

In some examples, the type(s) of communications can include one or more communications (e.g., media content usage rights transfer communication(s)) (or "usage rights transfer request(s)") for transferring usage rights of media content. The usage rights transfer request(s) can be performed in a similar way as for the ownership transfer request(s), as discussed above. In some examples, the public ledger registered information can include any of new usage rights (e.g., usage rights change data). In other examples, one or more portions of the new usage rights can be omitted from the public ledger registered information. Whether the public ledger includes the any of new usage rights in the public ledger registered information can be based on information received from the media content device 110. In some examples, information associated with selections indicated via user input received by a device of the new owner can be utilized to include, or omit, one or more portions of the new usage rights in the public ledger.

In some examples, the type(s) of communications can include one or more communications (e.g., media content restrictions update communication(s)) (or "restrictions update request(s)") for transferring usage rights of media content. The restrictions update request(s) can be performed in a similar way as for the ownership transfer request(s), as discussed above, except by modifying one or more of the restriction(s) in the restriction information, alternatively or additionally to, ownership. In some examples, the restrictions update request(s) can be utilized for processing restrictions update(s) for any media content subsequent, or prior to, any types of communications, as discussed herein.

Although the term "device" is utilized for simplicity and clarity throughout the current disclosure, it is not limited as such. Any occurrences of the term "device" can be utilized to refer to any type of device (e.g., a user device, a server, a system, etc.), and/or can be implemented by any number of devices, individually or in combination, in a similar way as for the device, for any of the techniques discussed herein.

Although "user device(s)" may be utilized for various techniques as discussed above in the current disclosure, it is not limited as such. In some examples, the user device(s) can be implemented for any techniques discussed herein, as any of the media content device(s) 102, and/or any other device(s) on which the media content 110 was not generated.

Although the term "user" or "owner" is utilized for simplicity and clarity throughout the current disclosure, it is not limited as such. Any occurrences of the term "user" or "owner" can be utilized to refer to any type of user (e.g., a user, and owner, an individual, a purchaser, a customer, an operator, etc.), and/or can be implemented as any number of users, individually or in combination, in a similar way as for the user, for any of the techniques discussed herein.

Although registration, validation, acquisition, identification, modification, authentication, ownership transfer, usage rights transfer, restrictions update, etc., of media content can be performed based on communication(s), as discussed above in the current disclosure, it is not limited as such. Any types of communications of any types can be exchanged for various purposes related to utilization of the media content 110, based on the public ledger registered information.

Figure 2:
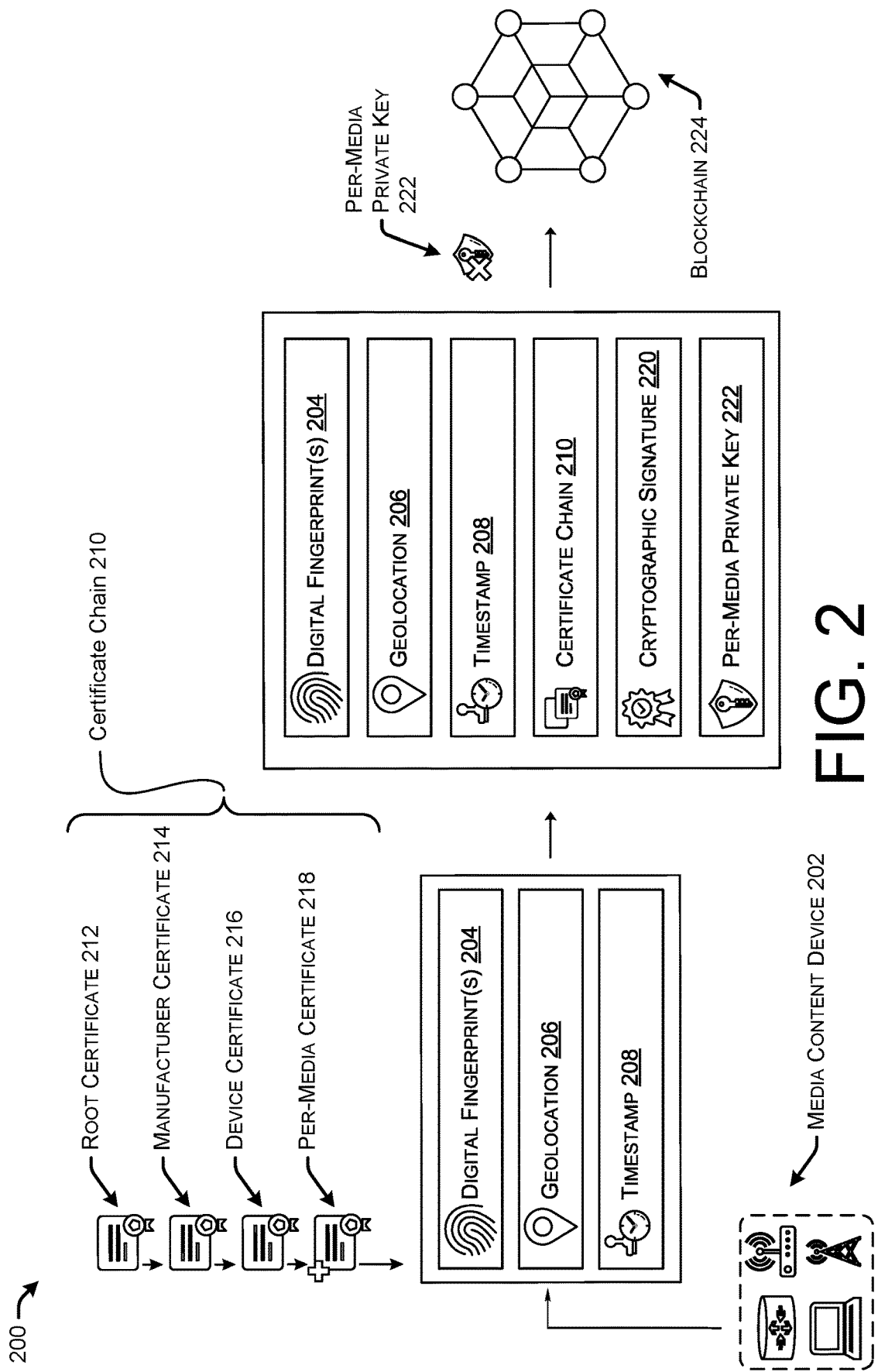
FIG. 2 is a schematic diagram of a device architecture utilized to perform embedded device based fingerprint signing and public ledger based digital signature registering management, in accordance with at least one embodiment.

FIG. 2 is a schematic diagram of a device architecture 200 utilized to perform embedded device based fingerprint signing and public ledger based digital signature registering management, in accordance with at least one embodiment. The device architecture 200 can be associated with a media content device 202, which can be implemented as any of the media content device(s) 102, as discussed above with reference to FIG. 1.

The media content device 202 can be utilized to identify and/or generate media content registration information associated with media content, which can be implemented as any of the media content 110, as discussed above with reference to FIG. 1. The media content registration information can include one or more digital fingerprints 204 associated with the media content 110. The digital fingerprint(s) 204 can be generated by identifying and/or generating one or more hash values as the digital fingerprint(s) 204. The media content registration information can include geolocations (e.g., a geolocation) 206 and/or timestamps (e.g., a timestamp 208) associated with the media content device 102 at generation of the media content 110.

The media content device 202 can identify and/or generate a certificate chain 210, including one or more digital certificates utilized to protect the media content 110 and preserve media content ownership. The digital certificate(s) can include a root certificate 212, a manufacturer certificate 214, a device certificate 216, and a per-media certificate 218. The device certificate 216, which can be signed by the manufacturer certificate 214, which can in turn be signed by the root certificate 212, can be utilized to sign the per-media certificate 218. The media content device 202 can identify and/or generate a cryptographic signature (or "digital signature") 220 by utilizing the per-media certificate 218 to sign a hash value (e.g., a hash value generated as the digital fingerprint 204, utilizing a mathematical algorithm) of the media content 110, and metadata associated with the media content 110.

A per-media private key (or "private security key") 222 can be generated along with the per-media certificate 212. The per-media private key 222 can be stored in an embedded IC of the media content device 102).

The media content device 202 can transmit, to the distributed device(s) 106 operating a public ledger (e.g., a blockchain) 224, one or more registration requests associated with the media content 110. By way of example, a registration request can be utilized to request public ledger registration of the media content 110, via the blockchain 224, using the digital fingerprint(s) 204, the geolocation 206, the timestamp 208, the certificate chain 210, the cryptographic signature 220. The registration request can omit the per-media private key 222, which remains stored in the embedded IC of the media content device 202. The media content 110 (e.g., public ledger registered information) registered with the public ledger can be published via the blockchain 224. The public ledger registered information (e.g., the digital fingerprint(s) 204, the geolocation 206, the timestamp 208, the certificate chain 210, the cryptographic signature 220) being published via the blockchain 224 can be accessed by any other device (e.g., the media content device(s) 102, the distributed device(s), and/or one or more other device).

Figure 3:
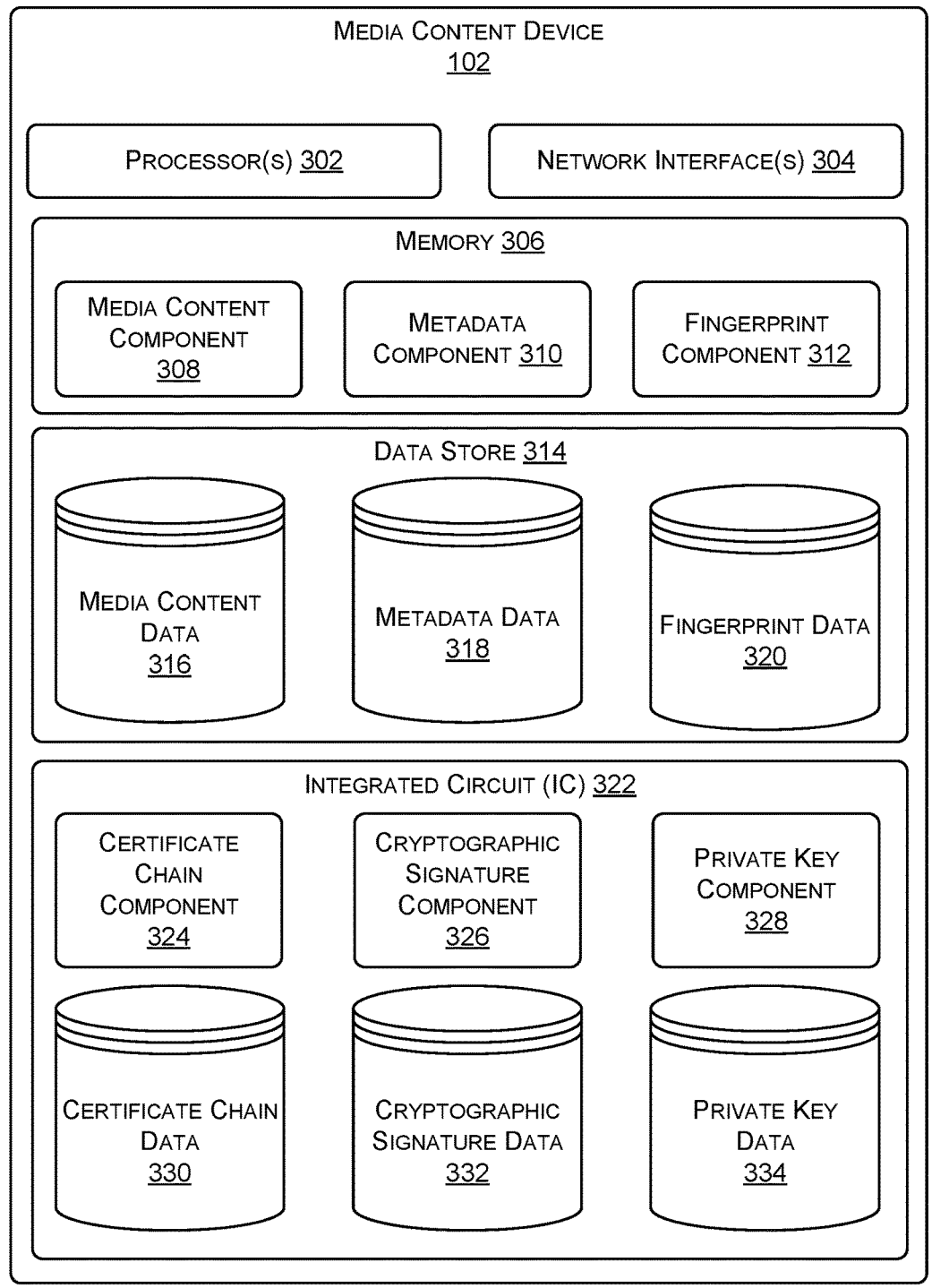
FIG. 3 is a computing system diagram illustrating a configuration for a computing device that can be utilized to implement aspects of the technologies disclosed herein.

FIG. 3 is a computing system diagram illustrating a configuration for a computing device 300 that can be utilized to implement aspects of the technologies disclosed herein.

Generally, the computing device 300, which may be implemented as one or more devices (e.g., the media content device(s) 102), may include one or more programmable controllers (e.g., a programmable controller) that manage some or all of media content activities (e.g., activities performed by the media content device(s) 102). As illustrated, the media content device(s) 102 may include, or run on, one or more hardware processors 302 (processors), configured to execute one or more stored instructions. The processor(s) 302 may comprise one or more cores. Further, the media content device(s) 102 may include or be associated with (e.g., communicatively coupled to) one or more network interfaces 304 configured to provide communications with the media content device(s) 102, other systems or devices in the media content device(s) 102, and/or other systems or devices (e.g., the distributed device(s) 106) remote from the media content device(s) 102. The network interface(s) 304 may include devices configured to couple to personal area networks (PANs), wired and wireless local area networks (LANs), wired and wireless wide area networks (WANs), and so forth. For example, the network interface(s) 304 may include devices compatible with any networking protocol.

The media content device(s) 102 may also include memory 306, such as computer-readable media, that stores various executable components (e.g., software-based components, firmware-based components, etc.). The memory 306 may generally store components to implement functionality described herein as being performed by the media content device(s) 102. The memory 306 may store a media content component 308 configured to manage media content generated by the media content device 102, as discussed above with reference to FIGS. 1 and 2. The memory 306 may store a metadata component 310 configured to manage metadata associated with the media content stored in the media content component 308. The memory 306 may store a fingerprint component 312 configured to manage digital fingerprints associated with the media content stored in the media content component 308.

Further, the media content device(s) 102 may include a data store 314. The data store 314 may store data associated with one or more components (e.g., the media content component 308, the metadata component 310, and the fingerprint component 312) of the memory 306. The data stored by the data store 314 may include media content data 316 received from, and/or managed by, the media content component 308. The data stored by the data store 314 may include metadata data 318 received from, and/or managed by, the metadata component 310. The data stored by the data store 314 may include fingerprint data 320 received from, and/or managed by, the fingerprint component 312.

The media content device(s) 102 may further include an embedded integrated circuit (IC) 322. The embedded IC 322 may include a certificate chain component 324 configured to manage certificate chains associated with the media content. The embedded IC 322 may include a cryptographic signature component 326 to manage cryptographic signatures associated with the media content. The embedded IC 322 may include a private key component 328 configured to manage one or more private keys associated with the media content. The private key(s) managed and/or stored by the private key component 328 can include a per-media private key and/or a per-device private key (e.g., the private key of the media content device 102). On some examples, the per-device private key can be created during manufacture of the device (e.g., the media content device 102) and can be signed by a manufacturer private key (e.g., a manufacturer private key associated with the manufacturer certificate). The per-device private key can be utilized to sign the per-media certificate as part of the certificate chain.

Further, the embedded IC 322 may store data associated with one or more components (e.g., the certificate chain component 324, the cryptographic signature component 326, and the per-media private key component 328) of the embedded IC 322. The data stored in the embedded IC 322 may include certificate chain data 330 received from, and/or managed by, the certificate chain component 324. The data stored in the embedded IC 322 may include cryptographic signature data 332 received from, and/or managed by, the cryptographic signature component 326. The data stored in the embedded IC 322 may include private key data 334 associated with, received from, and/or managed by, the private key component 328. In some examples, the private key data 334 can include the per-media private key, the per-device private key, and/or one or more other private keys.

In some instances, the steps of method 500 may be performed by a device and/or a system of devices that includes one or more processors and one or more non-transitory computer-readable media storing computer-executable instructions that, when executed by the one or more processors, cause the one or more processors to perform operations of method 500.

Figure 4:
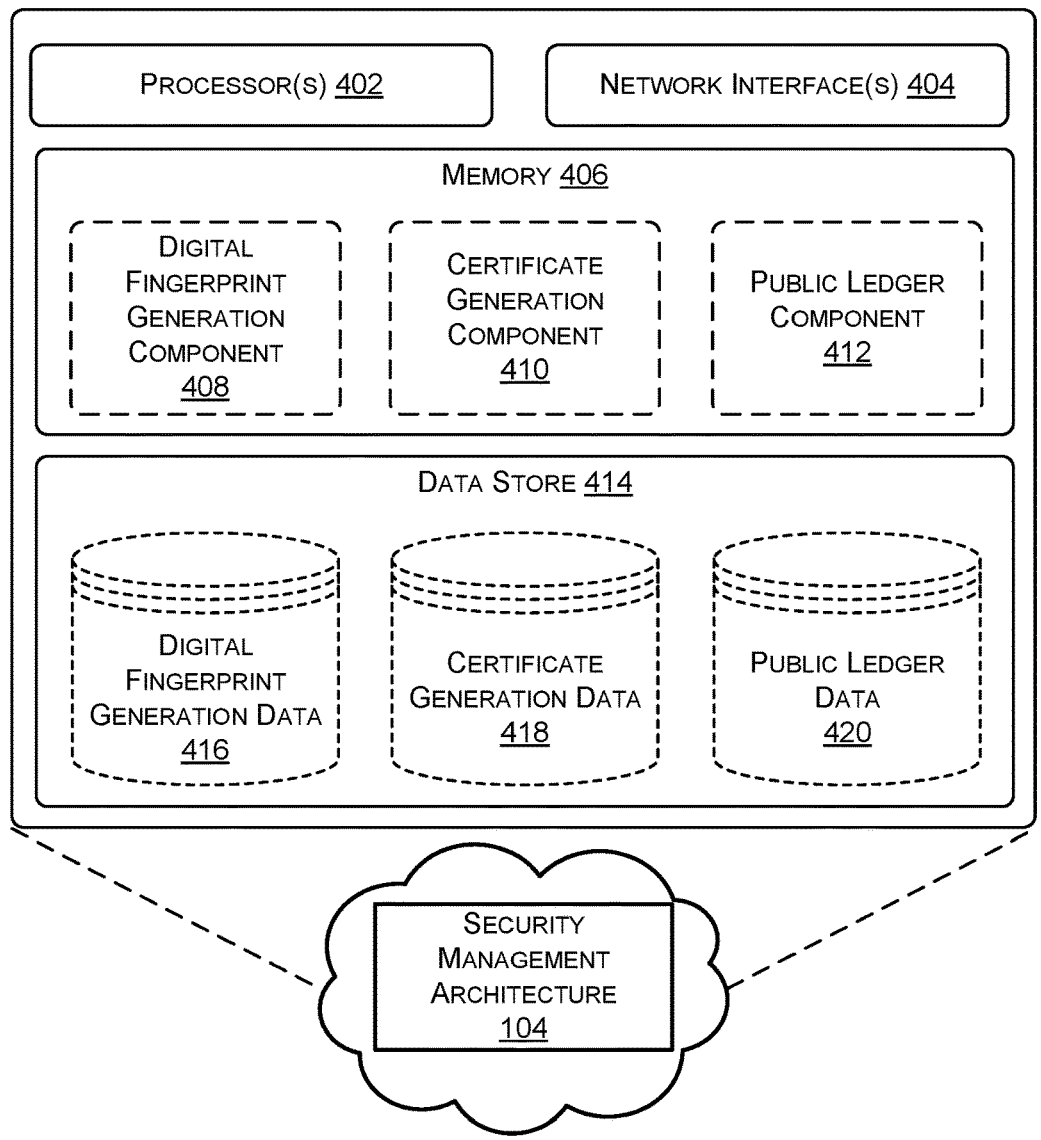
FIG. 4 is a computing system diagram illustrating a configuration for a data center that can be utilized to implement aspects of the technologies disclosed herein.

FIG. 4 is a computing system diagram illustrating a configuration 400 for a security management architecture that can be utilized to implement aspects of the technologies disclosed herein.

Generally, the security management architecture (e.g., the security management architecture 104), which may be implemented as one or more devices (e.g., the distributed device(s) 106), such as, in some examples, one or more servers (or "nodes") (e.g., a server), may include one or more programmable controllers (e.g., a programmable controller) that manage some or all of security management activities (e.g., activities performed by the security management architecture 104). As illustrated, the security management architecture 104 may include, or run on, one or more hardware processors 402 (processors), configured to execute one or more stored instructions. The processor(s) 402 may comprise one or more cores. Further, the security management architecture 104 may include or be associated with (e.g., communicatively coupled to) one or more network interfaces 404 configured to provide communications with the security management architecture 104, other systems or devices in the security management architecture 104, and/or other systems or devices remote from the security management architecture 104 (e.g., the media content device(s) 102). The network interface(s) 404 may include devices configured to couple to personal area networks (PANs), wired and wireless local area networks (LANs), wired and wireless wide area networks (WANs), and so forth. For example, the network interface(s) 404 may include devices compatible with any networking protocol.

The security management architecture 104 may also include memory 406, such as computer-readable media, that stores various executable components (e.g., software-based components, firmware-based components, etc.). The memory 406 may generally store components to implement functionality described herein as being performed by the security management architecture 104. The memory 406 may store a digital fingerprint generation component 408 configured to manage generation of one or more digital fingerprints based on one or more perceptual hashing algorithms, in response to one or more requests received from one or more devices (e.g., the media content device(s) 102). The perceptual hashing algorithm(s) may be utilized by the media content device(s) 102 and/or the security management architecture 104 to create the digital fingerprint(s). In such cases as for the digital fingerprint(s) being generated by the security management architecture 104 based on the request (s), the digital fingerprint(s) can be stored by the security management architecture 104 and/or transmitted to the media content device(s) 102. The request(s) can include content to be utilized by the management architecture 104 to generate the digital fingerprint(s), which can be generated in a similar way as for the digital fingerprint(s) generated by the media content device(s) 102, as discussed above with reference to FIGS. 1 and 2.

Alternatively or additionally, the memory 406 may store a certificate generation component 410 configured to manage generation of one or more certificates, in response to requests received from one or more devices (e.g., the media content device(s) 102). The certificate(s) being generated by the security management architecture 104 based on one or more requests from the media content device(s) 102, can be stored by the security management architecture 104 and/or transmitted to the media content device(s) 102. The request(s) can include content to be utilized by the management architecture 104 to generate certificate(s) of any type, which can be generated in a similar way as for the certificate(s) generated by the media content device(s) 102, as discussed above with reference to FIGS. 1 and 2.

Alternatively or additionally, the memory 406 may store a public ledger component 412 configured to manage a public ledger and/or information stored in the public ledger, in response to one or more requests received from one or more devices (e.g., the media content device(s) 102). The request(s) can include content to be utilized by the management architecture 104 to store public ledger information. In some examples, the memory 406 may store one or more of the digital fingerprint generation component 408, the certificate generation component 410, and the public ledger component 412; and one or more of the digital fingerprint generation component 408, the certificate generation component 410, and the public ledger component 412 may be stored in the memory 406 of one or more other devices (e.g., one or more others of the distributed device(s) 106).

In some instances, the steps of method 500 may be performed by a device and/or a system of devices that includes one or more processors and one or more non-transitory computer-readable media storing computer-executable instructions that, when executed by the one or more processors, cause the one or more processors to perform operations of method 500.

The security management architecture 104 may further include a data store 414, such as long-term storage, that stores digital fingerprint generation data 416 received from, and/or managed by, the digital fingerprint generation component 408. The data store 414 may store certificate generation data 418 received from, and/or managed by, the certificate generation component 410. The data store 414 may store public ledger data 420 (e.g., public ledger registered information, as discussed above with reference to FIG. 1) received from, and/or managed by, the public ledger component 412. In some examples, the data store 414 may store one or more of the certificate generation data 418 and the public ledger data 420; and one or more of the certificate generation data 418 and the public ledger data 420 may be stored in the data store 414 of one or more other devices (e.g., one or more others of the distributed device(s) 106). In those or other examples, the certificate generation data 418 and/or the public ledger data 420 may be stored by the data store 414 in the distributed device(s) 106 with the certificate generation component 410 and/or the public ledger component 412, respectively, being stored in the memory 406.

FIG. 5 illustrates a flow diagram of an example method 500 for embedded device based fingerprint signing and public ledger registering management.

At 502, a computing device can store, by an integrated circuit (IC) of the computing device, security data including at least one certificate. The at least one certificate can include a root certificate 212, a manufacturer certificate 214, a device certificate 216, and a per-media certificate 218. The device certificate 216, which can be signed by the manufacturer certificate 214, which can in turn be signed by the root certificate 212, can be utilized to sign the per-media certificate 218.

At 504, the computing device can utilize the at least one certificate to generate a cryptographic signature 220 associated with media content. The cryptographic signature 220 can be generated by utilizing the per-media certificate 218 to sign a hash value (e.g., a hash value generated as the digital fingerprint 204, utilizing a mathematical algorithm) of the media content 110, and metadata associated with the media content 110.

At 506, the computing device can generate a file (e.g., a local file) including the at least one certificate and the cryptographic signature. The file can include public ledger registered information (the digital fingerprint(s) 204, the geolocation 206, the timestamp 208, the certificate chain 210, the cryptographic signature 220).

At 508, the computing device can transmit a request to register the file with a ledger. The file can be registered with a blockchain 224.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A security service network architecture comprising a computing device, the computing device comprising:
   one or more processors; and
   one or more non-transitory computer-readable media storing computer-executable instructions that, when executed by the one or more processors, cause the one or more processors to perform operations comprising:
      generating, at the computing device, media content;
      identifying metadata associated with at least one of the computing device or the media content, the metadata indicating at least one of a geolocation of the computing device when the media content was generated or a timestamp indicating a time at which the media content was generated;
      identifying a digital fingerprint associated with the media content, the digital fingerprint representing the media content in a smaller format than the media content;
      storing, by an integrated circuit (IC) of the computing device, a device certificate identifying the computing device as a source device of the media content, the device certificate being signed by a manufacturer certificate associated with a manufacturer of the computing device;

utilizing the device certificate or a media certificate signed by the device certificate to generate a cryptographic signature associated with the metadata and the digital fingerprint;
generating a file, the file including the digital fingerprint, the metadata, a certificate chain of the cryptographic signature, and the cryptographic signature; and
transmitting, by the computing device, a request to register the file with a ledger.

2. The security service network architecture of claim 1, wherein the certificate chain indicates that the media certificate is signed by the device certificate, the device certificate is signed by the manufacturer certificate, and the manufacturer certificate is signed by a root certificate.

3. The security service network architecture of claim 1, wherein the cryptographic signature is generated by signing the metadata and the digital fingerprint with the media certificate.

4. The security service network architecture of claim 1, wherein generating the file further includes:
generating, by the IC, a local file, the local file including the digital fingerprint, the metadata, the certificate chain, the cryptographic signature, and a media private key associated with the media certificate;
storing the local file; and
modifying the local file to be the file by removing the media private key from the local file.

5. The security service network architecture of claim 1, wherein the ledger is a blockchain or a centralized public ledger, and
wherein transmitting the request further includes:
transmitting, by the computing device, the request to register the file with the blockchain or the centralized public ledger, the file further including identity information associated with a user of the computing device, the identity information being signed with the device certificate or the media certificate.

6. The security service network architecture of claim 1, wherein transmitting the request further includes:
refraining from providing, in the file, identity information associated with a user of the computing device.

7. A method performed at least partly by a computing device, the method comprising:
generating, at the computing device, media content;
identifying metadata associated with at least one of the computing device or the media content, the metadata indicating at least one of a geolocation of the computing device when the media content was generated or a timestamp indicating a time at which the media content was generated;
identifying a digital fingerprint associated with the media content, the digital fingerprint representing the media content in a smaller format than the media content;
storing, by an integrated circuit (IC) of the computing device, a device certificate identifying the computing device as a source device of the media content, the device certificate being signed by a manufacturer certificate associated with a manufacturer of the computing device;
utilizing the device certificate or a media certificate signed by the device certificate to generate a cryptographic signature associated with the metadata and the digital fingerprint;
generating a file, the file including the digital fingerprint, the metadata, a certificate chain of the cryptographic signature, and the cryptographic signature; and
transmitting, by the computing device, a request to register the file with a ledger.

8. The method of claim 7, wherein a certificate chain indicates that the media certificate is signed by the device certificate, the device certificate is signed by the manufacturer certificate, and the manufacturer certificate is signed by a root certificate.

9. The method of claim 7,
wherein the media certificate is associated with a media private key and utilizing the device certificate or the media certificate to generate the cryptographic signature further includes:
utilizing the media private key to sign, with the media certificate, the digital fingerprint, the metadata, a certificate chain, and the cryptographic signature.

10. The method of claim 7, further comprising:
generating the media certificate and a media private key, the media certificate being signed by the device certificate;
storing, by the IC and as a certificate chain, the media certificate and the device certificate, and
wherein generating the file further includes:
generating a local file, the local file including the certificate chain, the cryptographic signature, and the media private key;
storing the local file; and
modifying the local file to be the file by removing the media private key from the local file.

11. The method of claim 7, wherein the media content is first media content, and the file is a first file, further comprising:
identifying second media content, the second media content being a modified version of the first media content;
utilizing the device certificate or the media certificate to generate a second cryptographic signature associated with the second media content;
generating a second file, the second file including the device certificate or the media certificate, the second cryptographic signature, and a pointer, the pointer indicating an address in the ledger associated with the first file; and
transmitting, by the computing device, a second request to register the second file with the ledger.

12. The method of claim 7, wherein the device certificate is a first device certificate associated with the computing device, and the cryptographic signature is a first cryptographic signature, further comprising:
utilizing the device certificate or the media certificate to generate a second cryptographic signature to release ownership of the media content, the second cryptographic signature being associated with transfer authorization data;
generating a second file, the second file including the device certificate or the media certificate, the second cryptographic signature, and the transfer authorization data, and
transmitting the second file to a server, the second file being obtainable by a second computing device to transfer ownership of the media content, the second computing device storing a second device certificate usable to generate a third cryptographic signature associated with the media content and the transfer authorization data.

13. The method of claim 7, wherein the media content includes at least one frame of video content, further comprising:

generating at least one fingerprint, individual ones of the at least one fingerprint being associated with corresponding frames of the at least one frame, wherein utilizing the device certificate or the media certificate to generate the cryptographic signature further includes:

utilizing the device certificate or the media certificate to sign individual ones of the at least one fingerprint.

14. A system for security management, the system comprising:

one or more processors; and one or more non-transitory computer-readable media storing computer-executable instructions that, when executed by the one or more processors, cause the one or more processors to perform operations comprising:

generating, at a computing device, media content;

identifying metadata associated with at least one of the computing device or the media content, the metadata indicating at least one of a geolocation of the computing device when the media content was generated or a timestamp indicating a time at which the media content was generated;

identifying a digital fingerprint associated with the media content, the digital fingerprint representing the media content in a smaller format than the media content;

storing, by an integrated circuit (IC) of the computing device, a device certificate identifying the computing device as a source device of the media content, the device certificate being signed by a manufacturer certificate associated with a manufacturer of the computing device;

utilizing, by the IC, the device certificate or a media certificate signed by the device certificate to generate a cryptographic signature associated with the metadata and the digital fingerprint;

generating, by the computing device, a file, the file including the digital fingerprint, the metadata, a certificate chain of the cryptographic signature, and the cryptographic signature; and transmitting, by the computing device and to a server, a request to register the file with a ledger; and registering, by the server, the file with the ledger.

15. The system of claim 14, wherein a certificate chain includes the device certificate and a media certificate, the media certificate being associated with a media private key, and wherein the cryptographic signature is generated by utilizing the media certificate to sign, with the media private key, the digital fingerprint, the metadata, the certificate chain, and the cryptographic signature.

16. The system of claim 14, the operations further comprising:

utilizing, by the IC, the device certificate or the media certificate and usage right change data to generate a second cryptographic signature;

generating, by the computing device, a second file, the second file including the device certificate or the media certificate, the usage right change data, and the second cryptographic signature;

transmitting, by the computing device and to a server, a second request to register the second file with the ledger; and registering, by the server, the second file with the ledger.

17. The system of claim 14, wherein a certificate chain includes a root certificate, a manufacture certificate, the device certificate, and a media certificate.

18. The system of claim 14, the operations further comprising:

identifying identity information associated with a user of the computing device, the identity information including at least one of a user name or user contact information;

wherein utilizing the device certificate or the media certificate to generate the cryptographic signature further includes:

utilizing, by the IC, the device certificate or the media certificate to sign the identity information.

19. The system of claim 14, wherein the file is a first file, the operations further comprising:

identifying modified media content associated with the media content;

utilizing the device certificate or the media certificate to generate a second cryptographic signature associated with the modified media content;

generating a second file, the second file including the device certificate or the media certificate, the second cryptographic signature, and a pointer, the pointer indicating an address in the ledger associated with the first file;

transmitting, by the computing device, a second request to register the second file with the ledger; and registering, by the server, the second file with the ledger.

* * * * *